(12) United States Patent
Högnason et al.

(10) Patent No.: US 10,149,486 B2
(45) Date of Patent: Dec. 11, 2018

(54) APPARATUS FOR THAWING OR COOLING FOOD PRODUCTS

(75) Inventors: Albert Högnason, Isfindi (IS); Johann Jonasson, Kopavogi (IS)

(73) Assignee: 3X TECHNOLOGY, Isafjordur (IS)

( * ) Notice: Subject to any disclaimer, the term of this patent is extended or adjusted under 35 U.S.C. 154(b) by 458 days.

(21) Appl. No.: 13/266,287

(22) PCT Filed: Apr. 23, 2010

(86) PCT No.: PCT/IS2010/000006
§ 371 (c)(1),
(2), (4) Date: Oct. 26, 2011

(87) PCT Pub. No.: WO2010/125589
PCT Pub. Date: Nov. 4, 2010

(65) Prior Publication Data
US 2012/0042789 A1   Feb. 23, 2012

Related U.S. Application Data

(60) Provisional application No. 61/172,928, filed on Apr. 27, 2009.

(30) Foreign Application Priority Data

Apr. 27, 2009   (EP) .................................... 09158843

(51) Int. Cl.
*A23L 3/00*   (2006.01)
*A23B 4/06*   (2006.01)
(Continued)

(52) U.S. Cl.
CPC ............ *A23B 4/062* (2013.01); *A22B 5/0076* (2013.01); *A22C 21/00* (2013.01); *A23B 4/09* (2013.01);
(Continued)

(58) Field of Classification Search
CPC ........ A47J 31/06; A47J 19/022; A47J 31/446; A47J 19/06; A47J 31/005; A47J 31/0626;
(Continued)

(56) References Cited

U.S. PATENT DOCUMENTS 1,933,258 A * 10/1933 Goosmann ......................... 62/63
2,116,738 A *  5/1938 Zarotschenzeff ................. 62/63
(Continued)

FOREIGN PATENT DOCUMENTS

EP   1 413 363 A1   4/2004

OTHER PUBLICATIONS

European Search Report issued in EP 09 15 8843, dated Sep. 25, 2009, 3 pages.

*Primary Examiner* — Eric Stapleton
(74) *Attorney, Agent, or Firm* — Workman Nydegger

(57) ABSTRACT

An apparatus for thawing or cooling food products includes a tank adapted to be at least partly filled with a liquid. A spiral shaped blade extends between a first end and a second end of the tank, where the spiral shaped blade is mounted to a rotation axis which operates rotational movement of the spiral shaped bladed and thus the conveying of the food products from the first end towards the second end. A temperature controlling system is provided and adapted to control the temperature of the liquid by arranging multiple heat supplying units along the tank for injecting heating or cooling agents into the liquid so as to provide a substantial temperature distribution into the thawing liquid during the thawing or cooling of the food products.

14 Claims, 4 Drawing Sheets

(51) Int. Cl.

| | |
|---|---|
| *A23B 4/09* | (2006.01) |
| *A23L 3/36* | (2006.01) |
| *A23L 3/375* | (2006.01) |
| *F25D 3/12* | (2006.01) |
| *F25D 13/06* | (2006.01) |
| *A22B 5/00* | (2006.01) |
| *A22C 21/00* | (2006.01) |

(52) U.S. Cl.
CPC ............. *A23L 3/361* (2013.01); *A23L 3/375* (2013.01); *F25D 3/127* (2013.01); *F25D 13/065* (2013.01); *A23V 2002/00* (2013.01)

(58) Field of Classification Search
CPC ........ A47J 19/005; A47J 19/00; A47J 37/043; A47J 2027/043; A47J 37/041; A47J 37/045; A47J 37/0629; B30B 9/3053; B30B 15/14; B01F 15/0289; B01F 15/065; B01F 3/04751; F25D 25/04; F25D 23/12
USPC .......... 99/483, 325–328, 359–363, 366–368, 99/443 R, 443 C, 486, 487, 516, 527; 366/81, 91, 96, 100–104, 106, 107, 366/144–147; 62/62–70, 373–376
See application file for complete search history.

(56) References Cited

U.S. PATENT DOCUMENTS

| | | | |
|---|---|---|---|
| 2,289,727 A * | 7/1942 | Randolph | 426/311 |
| 2,478,889 A * | 8/1949 | Harris | 62/56 |
| 2,785,455 A * | 3/1957 | McElroy | 425/203 |
| 2,919,639 A * | 1/1960 | Crouin | 99/483 |
| 3,097,501 A * | 7/1963 | Pappas | 62/63 |
| 3,214,928 A * | 11/1965 | Oberdorfer | 62/63 |
| 3,271,304 A * | 9/1966 | Cox et al. | 210/621 |
| 3,320,964 A * | 5/1967 | Tripp | 134/100.1 |
| 3,446,030 A * | 5/1969 | Rubin | 62/63 |
| 3,485,055 A * | 12/1969 | Schlemmer, Jr. et al. | 62/63 |
| 3,906,743 A * | 9/1975 | Schorsch et al. | 62/374 |
| 3,990,641 A * | 11/1976 | Weston | 241/17 |
| 4,033,142 A * | 7/1977 | Schorsch et al. | 62/381 |
| 4,084,387 A * | 4/1978 | Schorsch et al. | 62/63 |
| 4,475,351 A * | 10/1984 | Klee | 62/63 |
| 4,525,370 A * | 6/1985 | Parkes | 426/508 |
| 4,569,204 A * | 2/1986 | Ott et al. | 62/63 |
| 4,697,508 A * | 10/1987 | Tallafus | 99/517 |
| 4,704,873 A * | 11/1987 | Imaike et al. | 62/64 |
| 4,758,097 A * | 7/1988 | Iles, Sr. | 366/149 |
| 4,813,154 A * | 3/1989 | Ronning | 34/395 |
| 4,843,840 A * | 7/1989 | Gibson | 62/375 |
| 4,875,344 A * | 10/1989 | Zittel | 62/381 |
| 4,942,810 A * | 7/1990 | Zittel et al. | 99/477 |
| 5,005,377 A * | 4/1991 | Tucek et al. | 62/374 |
| 5,009,511 A * | 4/1991 | Sarko et al. | 366/348 |
| 5,119,721 A * | 6/1992 | Satake et al. | 99/519 |
| 5,133,249 A * | 7/1992 | Zittel | 99/348 |
| 5,423,107 A * | 6/1995 | Thrash | 19/40 |
| 5,442,995 A * | 8/1995 | Greer | 99/487 |
| 5,456,091 A * | 10/1995 | Zittel | 62/375 |
| 5,632,195 A * | 5/1997 | Zittel | 99/348 |
| 5,692,382 A * | 12/1997 | Davison | 62/63 |
| 5,715,688 A * | 2/1998 | Jones, III | 62/63 |
| 5,752,431 A * | 5/1998 | Zittel | 99/348 |
| 5,780,088 A * | 7/1998 | Zittel et al. | 426/483 |
| 5,802,961 A * | 9/1998 | Hay et al. | 99/406 |
| 6,056,822 A * | 5/2000 | Jefferson et al. | 118/683 |
| 6,214,400 B1 * | 4/2001 | Zittel et al. | 426/509 |
| 6,234,066 B1 * | 5/2001 | Zittel et al. | 99/348 |
| 6,263,785 B1 * | 7/2001 | Zittel | 99/348 |
| 6,539,743 B2 * | 4/2003 | Jones | 62/381 |
| 7,281,384 B2 * | 10/2007 | Morris et al. | 62/64 |
| 7,441,942 B2 * | 10/2008 | McNeff et al. | 366/168.1 |
| RE42,732 E * | 9/2011 | Zittel et al. | 99/348 |
| 2005/0169613 A1 * | 8/2005 | Merrell et al. | 392/386 |
| 2006/0225438 A1 * | 10/2006 | Morris et al. | 62/64 |
| 2006/0225439 A1 * | 10/2006 | Morris et al. | 62/64 |

* cited by examiner (a)      (b)

APPARATUS FOR THAWING OR COOLING FOOD PRODUCTS

FIELD OF THE INVENTION

The present invention related to an apparatus and a method for thawing or cooling food products.

BACKGROUND OF THE INVENTION

Thawing apparatus is used to thaw frozen food products such as fish products. Such thawing apparatus typically comprises a thawing tank and a rotation axis which extends from an in-feed end of the tank to the other opposite out-feed-end and a water injection unit which injects hot or warm water into the tank at the in-feed end. A large spiral blade is mounted to this rotation axis which extends from the in-feed end to the out-feed-end. The thawing process is based on putting the frozen food products to be thaw into the tank that is filled partly with water at the in-feed end, where the thawing includes moving the frozen food products from the in-feed end towards the out-feed end via the rotating spiral blade. The rotation of the spiral blades ensures that the first fish products that first enter the in-feed end will be the first to reach the out-feed end ("first-in-first-out"). To ensure an optimal temperature in the tank, warm water at some optimal temperature and flow is injected constantly into the tank at the in-feed end of the thawing tank.

The drawbacks with such prior art thawing apparatus is that it is difficult or even impossible to ensure an optimal temperature distribution in the tank. This has the consequences that large ice/fish clusters can easily be formed somewhere in the tank because of uneven heat temperature distribution in the thawing tank. The conveying of the fish products or fish clusters must therefore be stopped, or when the conveyed fish products or fish clusters reach the out-feed-end will not yet been thawed.

Another drawback with the current thawing apparatus is related to thawing shell fish and other small fish products, but until now the frozen shell fish is typically in a form of blocks or clusters (many shell fish products frozen together) that are fed into the thawing tank at the in-feed-end, where also the water injection takes place. In order to avoid that the blocks get stuck together and form a larger clusters, one block at a time is put into the thawing tank and some time must lapse until the second block can be put into the tank. By doing so, the risk that the blocks get stuck together is reduced. This is continued until some preferred amount of shell fish and other small fish products has been put into the thawing tank at the in-feed-end. Since the warm water injection takes place at the in-feed-end, a very rapid cooling takes place there due to the large amount of cooling agent (the blocks) meaning that the heat of the injected water or the flow of the water must be increased. After feeding the shell fish blocks it is awaited until the blocks are thawed. This process typically takes several hours. Subsequently the spiral movement of the spiral blade is initiated and the shell fish and small fish products are conveyed from the in-feed-end towards the out feed end. The problem that frequently occurs during conveying the shell fish/small fish products is that they can easily be clamped between the spiral blade and the bottom of the tank which results in destroying some amount of the shell fish (small) fish during the conveying.

Another process that is worth of considering is a cooling process, which is adapted to cool down food products rapidly, e.g. processed fish that must be cooled down as soon as possible, but that are to be sold as fresh (not frozen). A typical cooling process that is currently used to cool down fish after being processed on board of a ship is to put the fish into tub with ice, and keep in that way until the ship arrives to the harbor. However, if the temperature of the fish is too high when it is put into the tub meaning that the melting of the ice starts almost immediately. There can be many hours or days until the ship arrives the harbor, but in the meantime the freshness of the fish has somewhat diminished and therefore the value of the fish.

US 2006/0225438 discloses a chiller for reducing temperature of buoyant birds, including semi-cylindrical tank that conforms to the perimeter of its auger so that the water can be raised to a water level high above the auger shaft. Streams of water are directed from the pulling side across the lower portion of the tank beneath the auger shaft to the dead side of the tank at intervals along the tank so as to disperse the lower portion of the masses of buoyant birds from the more crowded pulling side of the tank, beneat the auger shaft toward the more vacant dead side of the tank. In that way, the products become more evenly distributed throughout the tank causing more turbulence in the tank. In that way, the rate of heat transfer from the birds is increased thus avoiding having the birds cross over the auger shaft moving backward in chiller into a flowing flight of the auger. This reference is however limited to chilling food products.

SUMMARY DESCRIPTION OF THE INVENTION

The object of the present invention is to provide an improved thawing or cooling system that overcomes the above mentioned drawbacks.

According to a first aspect, the present invention relates to an apparatus for thawing or cooling food products, comprising:
- a tank adapted to be at least partly filled with a heating or cooling liquid,
- a spiral shaped blade extending between a first end and a second end of the tank, the spiral shaped blade being mounted to a rotation axis which operates rotational movement of the spiral shaped bladed and thus the conveying of the food products from the first end towards the second end, and
- a temperature controlling system adapted to control the temperature of the liquid, wherein the temperature controlling system comprises multiple heat or cooling supplying units arranged along the tank for injecting heating or cooling agent into the liquid so as to provide a substantial uniform temperature distribution into the liquid during the thawing or cooling of the food products.

It follows that an effective thawing or cooling system is provided that can much more effectively thaw or cool food products in a much shorter time and under a controlled circumstances. In case the system is used for thawing frozen food products, the fact that the temperature can now be fully controlled and is uniformly distributed means that the time needed for thawing the food products is greatly reduced.

In case the system is used for cooling down food products it is ensured that a sudden temperature gradients are formed in the liquid, which firstly reduces the cooling time needed to cool the food products down to a given target temperature, and secondly it is prevented that bacterium are formed within the liquid.

In one embodiment, the multiple heat or cooling supplying units are arranged at substantial equal length intervals under the tanks. By arranging the heat supplying units under the tank at equal length intervals the heating or cooling agent entering the liquid, which in one embodiment is water, will be substantially equally distributed within the tank.

In one embodiment, the multiple heat or cooling supplying units comprise multiple nozzles extending upwardly from a common heat or cooling supplying pipe and into the tank, where the heat or cooling supplying pipe is connected to a heat or cooling supplying source. In one embodiment, the heat and cooling agent is selected from: hot steam, water, hot or cold air, dry ice, dry or slush ice, cold air, or a combination thereof. In that way, many different heat supplying sources can be provided for supplying the heat into the liquid. In case water is used as a heating or cooling agent, the temperature of the water can simply be adjusted to the process, i.e. whether the water is to be used as a heating or cooling agent and the type of the food product to be cooled down or thawed.

In one embodiment, the apparatus further comprises air supply sources arranged along and below the tank at substantially equal distances for pumping air into the liquid. This is of a particular advantage because large amount of relative small air bubbles at the bottom of the tank are created which all together create a large surface area which is highly favorable for supplying buoyant force on the food products in the liquid. This is particularly relevant when the process is thawing smaller fish products such as shrimps which can easily sink and be concentrated at the bottom of the tank during conveying the shrimps form the in-feed end towards the out-feed end of the tank. By blowing air into the liquid it is thus ensured that the shrimps (and other smaller fish products) are at least somewhat distributed with in the liquid. By lowing air into the tank breaks up possible laminated flow across the tank. This ensures more equal temperature distribution in the tank.

In one embodiment, the air supply sources are an integral part of said multiple nozzles. Accordingly, an extra connector to the air supply system can be provided within the air nozzle, or the air can simply be mixed with the heat or cooling supplying units such that e.g. hot/warm water that is used as a heat agent can be mixed with the air so that both heat is supplied into the liquid and also air necessary to create said air bobbles.

In one embodiment, the temperature controlling system further comprises at least one thermometer arranged within at least one of the intervals for measuring the temperature of the liquid within the at least one interval, the measured temperature being used as a control parameter for controlling the injection of the heat into the tank and thus the temperature of the liquid. In that way, the amount of heat to be injected into the liquid can be fully controlled and in that way a constant temperature can be maintained. The controlling may e.g. include controlling the heat within each interval independently since the temperature within two or more intervals (one section of the tank) may be different since the distribution of the food products within the tank may be different. Accordingly, if e.g. a large amount of frozen fish is located within one interval (section) of the tank, the temperature within this section will be lower compared to the remaining sections and thus it may be preferred to inject more heat within this section compared to the remaining sections. The injection of heat may in one embodiment be done by increasing the flow/second of heat/cooling agent into the liquid.

In one embodiment, the tank is separated into a lower bottom section and an upper section, the lower bottom section having a circular cross sectional shape of a diameter being substantially the same as the diameter of the spiral shaped blade such that the distal part of the spiral shape blade is adjacent to the inner lower bottom section of the tank, and where the upper section comprises at least one drain unit for allowing drainage of access liquid from the tank. Accordingly, in case the injected heat is warm water it is ensured that the tank will not be over-filled with liquid. The drain unit may include several drain units or a single drain unit (a gutter) extending along the upper section of the tank. Also, since the supplied heating/cooling source is injected under the tank the lower portion of the liquid will always be warmer/colder than the upper portion. Thus, in addition of preventing that the tank will be over-filled it is ensured that the colder/warmer part of the liquid will be conducted out of the tanks.

In one embodiment, the access liquid is heated up or cooled down and injected again into the tank. In that way the access liquid is in a way re-cycled into the system and used again and in that way there is no waste in the liquid.

In one embodiment, the apparatus further comprises a filter placed between the at least one drain unit at the location where the access liquid is injected again into the tank. Accordingly, the access liquid is cleaned before it is injected again into the tank and thus ensured that a fully cleanness is preserved during the thawing or cooling process.

In one embodiment, the food products are frozen food products and the in-feeding of the frozen food products into the tank is performed at the first end which acts as an in-feed end, where during the in-feeding the rotation axis rotates the spiral shaped blade at a rotations speed which is adapted to the length of the tank such that the when the food products reach the opposite end of the tank the food products are thawed. This is of a particular advantage where the frozen food products are frozen fish or fish blocks such as whitefish, salmon, cod, haddock and the like. For thawing fish products of this size, it is most favorable to feed the fish (blocks) at one end while the spiral shaped blade rotates, such that the first frozen food products that are fed into the tank are the first to leave the tank (first in-first out principle).

In one embodiment, the food products are frozen food products and the in-feeding of the frozen food products into the tank is performed along the side of the tank, the rotation of the spiral shaped blade being started as soon as the frozen food products are thawed so as to convey the thawed food products out of the tank. This is of a particular advantage when the frozen food products to be fed into the tank along the side of the tank are frozen shell fish products such as shrimps and other small fish products such as capelin which in the form of relative large ice/fish blocks or clusters. Accordingly, by distributing the frozen fish block along the tanks the thawing process becomes much more effective instead of putting them into the tank at only one end (in-feed end). Also, such a distribution ensured that the heat distribution of the liquid will be substantially equal which makes it possible to control the temperature of the liquid more effectively.

In one embodiment, the thawing apparatus further comprises a take-away conveyor arranged at the second end adapted for conveying the thawed food products out of the tank.

In one embodiment, the food products are poultry items where the apparatus is adapted to cool down the poultry items after being heated up during processing the poultry items. When poultry items are processed, e.g. when plucking chicken, they are usually heated up to e.g. 50° C. or even more, which facilitates plucking the chicken. After this has been done, the must be cooled down as rapidly as possible to avoid formation of bacterium in the poultry items/ chicken. Accordingly, such processed poultry items may be cooled down rapidly, and maybe more importantly, by injecting cooling agent such as slush ice into the liquid during conveying the poultry items in the tank, it is ensured that the heat of the liquid is maintained correct, e.g. close to 0° C. and by doing so bacterium formation within the liquid is prevented.

In one embodiment, the food products is fish where the apparatus is adapted to cool down the fish. The fish may be fish that have just been driven through a bleeding process, e.g. driven through a further a bleeding tank comprising a similar spiral shaped blade extending between a first end and a second end of the bleeding tank. Such a bleeding tank may be adapted to convey processed fish from the first end towards the second end of the bleeding tank at a conveying speed that is adapted to the bleeding time of the fish such that when the fish enter the second end of the bleeding tank the bleeding process has been completed. Such bleeding is done to preserve the quality of the fish meat. Subsequently, the system cools down said fish after being conveying through the bleeding tank from the first end and a second end of said tank and in that way they are very rapidly cooled down, but such a rapid cooling down process can only increase the value of the fish. The fish is then put into a tub filled with ice, typically several ice layers are formed with such fish there between. The advantage of this cooling process is thus that the temperature of the fish after this cooling process can be so low that the melting in the tub will be strongly reduce compared to fish that have not undergone such a cooling process. This means that the value of the fish which will be sold as fresh fish (not frozen) will be higher because the freshness will be much better preserved.

According to another aspect, the present invention relates to a method of thawing frozen food products, comprising:
  filling a tank at least partly with a heating or cooling liquid at a first temperature,
  conveying food products in the tank from a first end towards a second end, the conveying being performed via rotational movement of a spiral shaped blade that extends between the first end and the second end of the tank and is operated via a rotation axis, and
  controlling the temperature of the liquid,
wherein the temperature controlling is performed at multiple locations along the side of the tank by injecting heating or cooling agents into the liquid so as to provide a substantial uniform temperature distribution into the liquid during the thawing or cooling of the food products.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which FIGS. 1a,b show a perspective view and a side view of one embodiment of an apparatus according to the present invention for thawing or cooling food products.

DESCRIPTION OF EMBODIMENTS

Figure 1A:
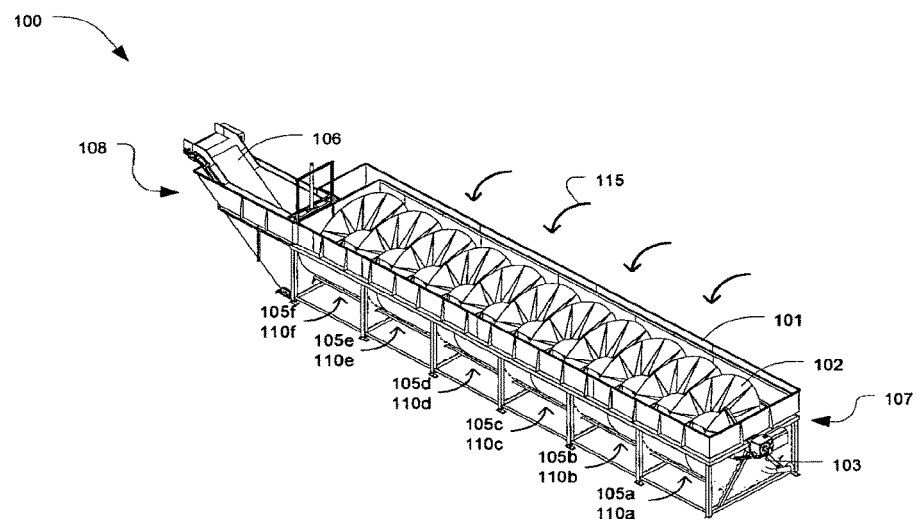
Figure 1B:
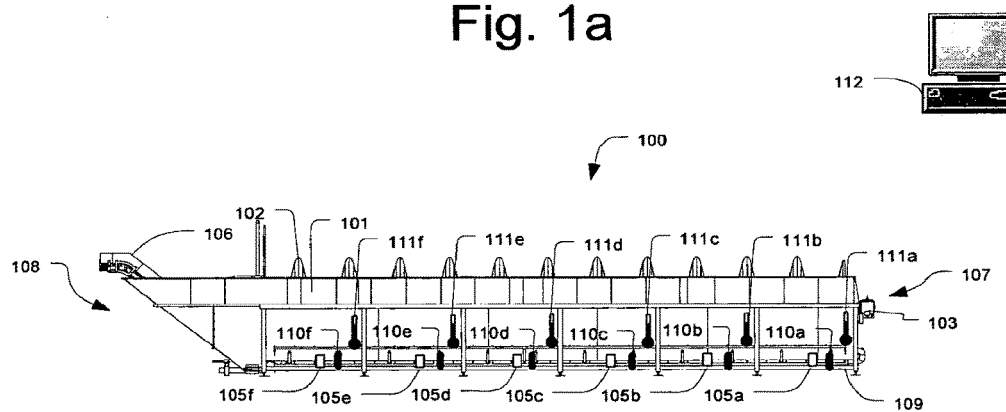

FIGS. 1a,b show a perspective view (FIG. 1a) and a side view (FIG. 1b) of one embodiment of thawing or cooling apparatus 100 according to the present invention for thawing or cooling food products. The food products may be any type of a food product, such as meet, poultry items and fish. If the food products are frozen fish products, e.g. ground fish, mackerel or shellfish, they are often in a form of frozen blocks where many of the fish products are frozen together or together with a liquid such as water. The blocks can e.g. weight from 5 kg to 30 kg and therefore the thawing process includes thawing the blocks in addition to thawing the individual fish products.

The apparatus 100 comprises a tank 101, a spiral shaped blade 102 (auger) mounted to and operated by a rotation axis (auger shaft) via rotation motor 103 and a temperature controlling system 105a-105f. The tank 101 is preferably made of a stainless steel and is adapted to be at least partly filled with a liquid, e.g. water or water mixed with chemical compounds so as to speed up the thawing process. The tank can be divided into multiple sections which during installation of the apparatus 100 are mounted together and in that way the length of the tank can easily be enlarged or reduced by adding or removing sections.

The spiral shaped blade 102 extends between a first end 107 and a second end 108 of the tank 101. The spiral movement of the blade acts as a conveyor where the food product become conveyed from one the first end 107 (in-feed end) towards the opposite second end 108 (out-feed end), where the rotation of the spiral shaped blade 102 creates a horizontal force on the food products causing them to move from the first end 107 towards the second end 108. The rotational speed of the spiral shaped blade is adapted to the thawing or cooling process and may as an example take 1 hour and up to three hours or even more depending on the type of the food product, i.e. the time from where a food product is fed into the tank at the in-feed end 107 until it reaches the out-feed end can last up to few hours.

In one embodiment, the temperature controlling system further comprises at least one thermometer 111a-111f arranged as an example within at least one of the intervals (sections) for measuring the temperature of the liquid within the at least one section.

The measured temperature is then used as a control parameter used by a computer system 112 for controlling the temperature of the liquid, e.g. for controlling the amount of heating or cooling agent into the tank and thus the temperature of the liquid. In that way, the temperature of the liquid is fully computer controlled.

The temperature controlling system comprises multiple heat supplying units 105a-105f arranged along the tank 101 for injecting heating or cooling agents into the liquid as a response to the measured temperature of the liquid so as to provide a substantial uniform temperature distribution in the liquid during the cooling or thawing of the food products. In the embodiment shown here, the multiple heat supplying units are nozzles 105a-105f extending upwardly from a common heat or cooling supplying pipe 109 and into the tank 101. As shown the nozzles 105a-105f are situation at substantially equal length intervals where the heating/cooling agent may be e.g. hot/cold (warm) water or warm/hot air or hot steam or slush ice that are injected from the pipe 109 into the liquid such that the temperature of the liquid becomes substantially equally distributed and fully controlled. The injection of heating or cooling agent may e.g. be performed by increasing the flow/second into the liquid. The controlling may e.g. include controlling the temperature within each of said sections independently (the temperature within each section may be measured) since the temperature within two or more sections may be different since the distribution of the food products within the tank may be different, or the controlling may include controlling the temperature within all the sections simultaneously (in a non-independent way). In the former case, if e.g. a large amount of frozen fish is located within one interval (section) of the tank, the temperature within this section will be lower compared to the remaining sections and thus it may be preferred to inject more heat (e.g. warm water) within this section compared to the remaining sections. The injection of heat may in one embodiment be done by increasing the flow/second of heat/cooling agent into the liquid.

In case water is used as a heating or cooling agent, the pipe 109 may be connected to a water source (not shown here) which supplies warm/hot water or cold water. The supplied water may be heated up or cooled down via an appropriate water heating/cooling mechanism (not shown here).

Although the figure shows a single nozzle at each location at the bottom section, multiple nozzles may just as well be provided at each location, e.g. two, three or more nozzles may be distributed along the cross section of the tank 101 instead of a single nozzle at the bottom section.

In one embodiment, the apparatus further comprises air supply sources 110a-110f arranged along and preferably below the tank at substantially equal distances for pumping air into the liquid. By doing so small air bubbles are created at the bottom of the tank that create a large air bobble surface area which is highly favorable for supplying buoyant force on the food products in the liquid. This is particular relevance when the food products are frozen small fish products such as shrimps, which typically are received as large ice blocks. The ice blocks are preferably fed into the tank 101 along the sides of the tank to ensure a uniform temperature distribution within the tank 101. After they are thawed, they can easily sink and be concentrated at the bottom of the tank 101 during conveying the shrimps from the in-feed 107 end towards the out-feed end 108 of the tank 101. Thus, by blowing air into the liquid it is thus ensured that the shrimps (and other smaller fish products) are at least somewhat distributed with in the liquid. These air supply sources 110a-110f may be an integral part of said multiple nozzles 105a-105f, or they may be separate from the nozzles as depicted here.

In the embodiment shown here, the temperature controlling system further comprises a take-away conveyor 106 arranged at the second end 108 adapted for conveying the thawed food products out of the tank 101.

Assuming the food products are frozen food products, the in-feeding of the frozen food products into the tank 101 depends on the type of the frozen food products. In prior art thawing apparatus, the in-feeding of the frozen food products takes place at one end of the tank 101 (in-feed end) where also the warm water in injected into the tank. However, for fish products such as shrimps which are typically in the form of frozen ice blocks, as discussed previously, it is more favorable to feed such blocks into the tank 101 from the sides as indicated by the arrows 115. By doing so, the ice blocks are uniformly distributed within the tank 101, which makes the thawing much faster, instead of putting the entire ice block into the tank 101 at the in-feed end 107 where they can easily get stuck together. Also, by feeding the entire block at this one side the liquid gets very rapidly cooled down and the temperature becomes too low. After the shrimps are thawed, which can take several hours, the rotation of the spiral shaped blade is started and the thawed shrimps are conveyed out of the tank.

In order to minimize the labor, the system 100 may further comprise an electronic driven conveyor (not shown) for full pallets with frozen blocks and scissor elevator which is placed at the in-feed end or the sides of the tank. The operator can adjust the height of the pallets when feeding the block into the tank.

Said thawing/cooling process may be fully computer controlled where an operator can enter various control parameters into said computer system 112 via an appropriate user interface. The operator can e.g. adjust the cooling or thawing process simply by entering the appropriate parameters, where the parameters can as an example be the liquid temperature (target temperature), the frequency of air inflows over lapsed thawing time, the inflow of (heat) temperature controlled liquid, the speed of the spiral shaped blade and thus the conveying speed, the length of the tank, the type of food product to be cooled down or to be thawed, etc. Accordingly, said apparatus 100 may be fully computer controlled where an appropriate software product is programmed so as to receive said various input parameters from the operator and said temperature values from the said thermometers 111 to adjust the flow of said heating or cooling agents into the liquid.

Figure 2:
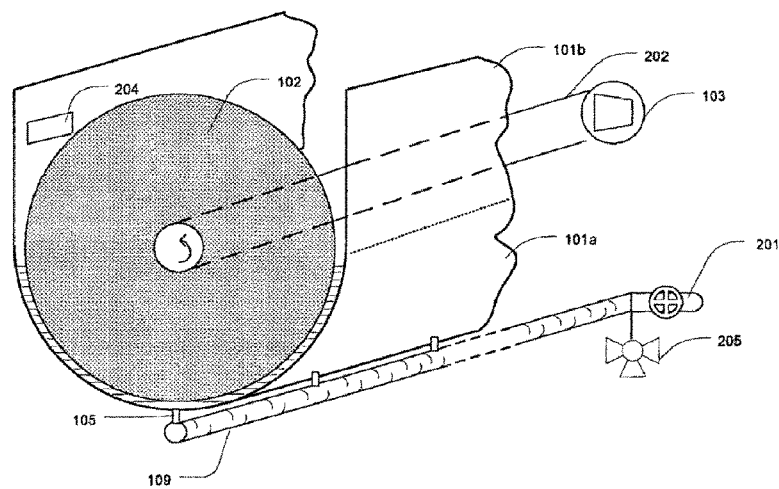
FIG. 2 shows cross-section of the apparatus from FIG. 1, FIGS. 3a,b depicts graphically the difference between a prior art thawing system (FIG. 3a) where no heat system is provided along the tank, and a thawing system according to the present invention (FIG. 3b) where heat supplying system is provided along the tank.

FIG. 2 shows cross-section of the apparatus 100 from FIG. 1, showing a part of the spiral shaped blade 102, a rotation axis 202 and the driving motor 103 that operates to rotation speed of the rotation axis 202 and thus the spiral shaped blade 102.

The tank 101 is separated into two sections, a lower bottom section 101a and an upper section 101b. The lower bottom section 101a has a circular cross sectional shape of a diameter being substantially the same as the diameter of the spiral shaped rotation blade 102 such that the distal part of the spiral shape blade is adjacent to the inner lower bottom section of the tank 101a.

The upper section 101b comprises at least one drain unit 204 which as shown here is simply an opening for allowing drainage of access liquid from the tank 101. The drain unit may also be a gutter, i.e. an opening that extends along the upper section 101b of the tank (not shown here). In one embodiment, the access liquid is conducted away from the drain unit 204 (not shown here) and is heated up or cooled down and circulated back into the tank 101 and used again. This is obviously a very environmental friendly process since the access liquid will be re-used. In a preferred embodiment, a filter or a cleaning unit (not shown) is placed between the at least one drain unit 204 and the location where the access liquid is injected again into the tank 101.

FIG. 2 depicts graphically a liquid source 201 where the heating or cooling agents are pumped into the pipe 109. As mentioned previously, the liquid may be e.g. be water where the source 201 can simply be water intake. One way of controlling precisely the liquid (water) temperature in the heat supplying pipe 109 is by providing a computer controlled valve 205 that is operated by said computer system 112 based on said temperature control parameters measured by said one or more thermometers 111. This may be done by e.g. mixing hot and cold water, or by using other means such as heat elements for heating up the liquid (the water) before injecting it into the liquid.

FIG. 3a,b depicts graphically the difference between a prior art apparatus (FIG. 3a) where no heat controlling system is provided along the tank 101 (only at the in-feed end 107), and an apparatus 100 according to the present invention, where said heat supplying units are provided along the tank 101 (FIG. 3b) at some intervals and inject a heating agent, e.g. warm water, into the heating liquid 300 inside the tank 101. This of course depends on the size and/or shape and/or the volume of the tank, as well as the application process, i.e. whether the process include cooling or thawing and/or the type of food products to be thawed or cooled down.

FIG. 3a depicts graphically an example of a situation that can easily occur in prior art thawing process where the temperature $t_1$ in the liquid becomes too low resulting in that a cluster or ice block of fish products (e.g. shrimps) are formed partly due to low temperature (e.g. somewhere in the middle of the tanks), whereas by arranging said heating or cooling supplying units 105 along the tank 101 as shown in FIG. 3b it is ensured that the temperature $t_2$ is correct or optimal and uniformly distributed.

An example of a preferred temperature during the thawing process is 25° C. to start with when the product is frozen shrimps blocks, 4-15° C. when the product is frozen ground fish where this temperature is preferably maintained constant (e.g. 10° C.). An example of temperature during cooling process is between −0.5° C.-+0.5° C. or even lower/larger. It should be noted that these values depend on the individual products as well as the length/dimension of the tank 101 and are given for exemplary purposes.

FIG. 3b also shows the embodiment shown in FIG. 1 where air supply nozzles 210 connected to air supply source 110 are provided along the tank 101, which blow air into the liquid for creating air bubbles 302. They act as an upwardly exerting force (buoyancy force) on the food products and in that way ensure that the food products become substantially or at least somewhat uniformly distributed within the liquid. As an example, if the food product is shrimps, after the shrimp clusters have been thawed, they are conveyed out of the tank via the said spiral movement of the spiral shaped rotation axis. Due to the fact how small the shrimp is it can easily be clamped between the bottom of the tank 101 and the spiral shaped blade 102 (not shown in this figure). The effect of the air bubbles is to avoid that the shrimps sits at the bottom of the tank, i.e. it is ensured that it is lifted up from the bottom of the tank as shown here.

An example where the apparatus 100 is used for cooling down food products is where the food product is poultry, e.g. chicken, but when poultry items are processed, e.g. when plucking chicken, usually heated up (up to scalding), e.g. 50° C. or even more, which facilitates plucking the chicken. After this has been done, they must be cooled down as rapidly as possible to avoid formation of bacterium in the poultry items/chicken. Accordingly, such processed poultry items may be cooled down rapidly, and maybe more importantly, by injecting cooling agent such as slush ice into the liquid during conveying the poultry items in the tank, it is ensured that the heat of the liquid is maintained correct, e.g. close to 0° C. and by doing so bacterium formation within the liquid is prevented.

Figure 3:
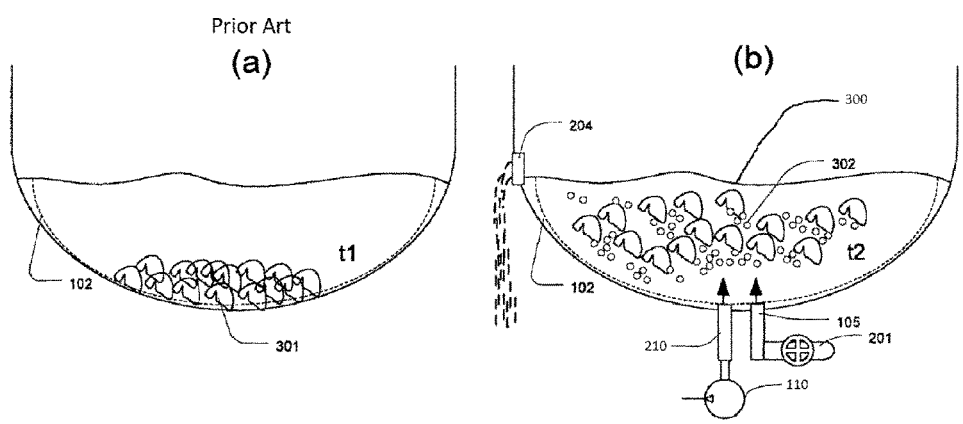
Figure 5:
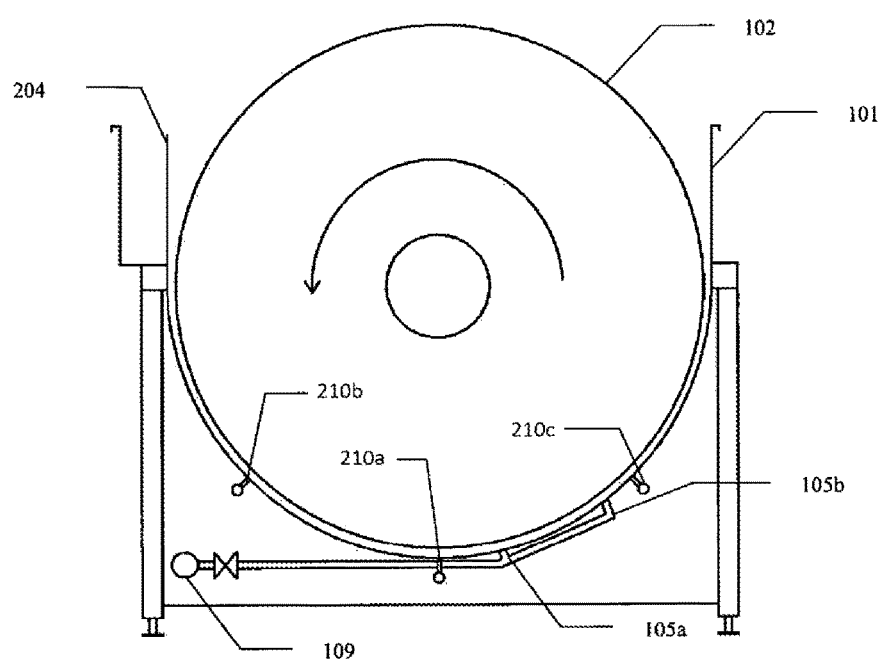
FIG. 5 shows another embodiment of an apparatus as shown in FIG. 3, showing a cross-sectional view of the tank.

FIG. 5 shows another embodiment of an apparatus as shown in FIG. 3, showing a cross-sectional view of the tank 101 but in this embodiment three air supply nozzles 210 are distributed along the arc-shaped lower bottom section 101a of the tank, one at the bottom of the tank 210a, one at the left side 210b and one at the right side 210c of the tank. The nozzles 105a,b of the heat supplying units shown here are arranged at one side of the lower bottom section 101a of the tank and inject thawing liquid, preferably warm/hot water, but this side is selected with respect to the rotation of the spiral shaped blade 102 because this is the side to which the food products seek due to the pressure cause by the rotation of the spiral shaped blade 102. By arranging the air supply nozzles 210 in such a symmetrical way the food products to be thawed becomes uniformly distributed within the tank, i.e. the average space between the food products is maximized, which enhances the thawing process. Also, this arrangement of the air supply nozzles 210a, 210b, 210c and the nozzles 105a,b of the heat supplying units prevent the food products from accumulating at the bottom of the tank 101 and ensures that the temperature in the tank becomes uniformly distributed.

It should be notated that the embodiment depicted in FIG. 5 should not be construed as being limited to only three air nozzles and two heat supply nozzles. The number of air and heat nozzles can just as well be different from what is shown here.

Such an thawing apparatus is particularly suitable for thawing and infusion of schrimps and other small fish products. An example of a process of thawing such products is following: the frozen small fish products are fed substantially uniformly along the side of the tank 101, i.e. substantially equally into the compartments formed between adjacent spiral blades. The thawing liquied may be cold, warm or hot water, and the temperature controlling may either be in operation or not. In that way, the thawing apparatus is in a way initially being used as a "preserving" apparatus. After some time, e.g. few hours, then fish products are thawn or almost thawn. Then, the rotational movement of the spiral shaped bladed is started and the fish products are moved towards the second end where they are removed from the tank 101.

When thawing demersal fish, it is preferred that the tank 101 being used is substantially of the same height as the rotation axis, i.e. the center of the spiral shaped blade.

Figure 4:
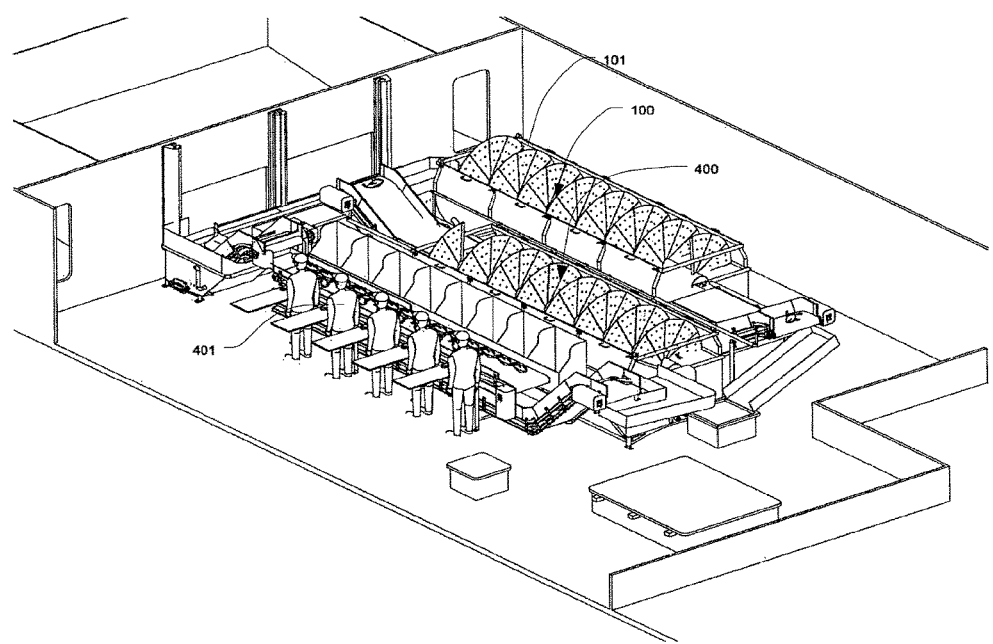
FIG. 4 shows a processing line on board of a ship comprising a comprising bleeding tank apparatus and said apparatus which is used for cooling fish products.

FIG. 4 shows a processing line on board of a ship comprising a comprising bleeding tank apparatus 400 and said apparatus 100 which is used for cooling fish products.

As depicted here, an operator 401 processes fresh fish (only few minutes or hours old). In order to increase the value of this fresh fish it is run through the bleeding tank apparatus 400, that in one embodiment may be identical to said apparatus 100, i.e. comprising a similar spiral shaped blade extending between a first end and a second end of the bleeding tank, plus the temperature within the bleeding tank may be fully controlled as discussed previously. The bleeding tank apparatus is adapted to convey the processed fish from the first end towards the second end of the bleeding tank at a conveying speed that is adapted to the bleeding time of the fish such that when the fish enters the second end of the bleeding tank the bleeding process has been completed. Before placing the fish into a fish tub where it is kept until the fish is delivered to buyers of the fish. It is therefore important that the cooling of the fish has been optimal because few days can pass until the ship arrives onshore.

The processing line shown here includes further said apparatus 100 for cooling down the fish that has just undergone the bleeding process, where the fish enters one end of the tank 101 where the liquid in the tank, e.g. water is 0° C. or the tanks is filled with slush ice of a mix of a slush ice and water and in that way the temperature may be lower the 0° C. By conveying the fish from one end of the tanks towards the opposite end it will be very rapidly cooled down and even reach a temperature close to 0° C. Subsequently, the fish is put into a tub filled with ice, typically several ice layers are formed with such fish there between. The advantage of this cooling process is thus that the temperature of the fish after this cooling process can be so low that the melting in the tub will be strongly reduce compared to fish that have not undergone such a cooling process. This means that the value of the fish which will be sold as fresh fish (not frozen) will be higher because the freshness will be much better preserved.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. An apparatus for thawing frozen food products, comprising:
    a tank having first and second ends, and a heating liquid located therein for thawing the food products, the tank defining a plurality of sections along a length of the tank;
    a spiral-shaped blade having a rotational axis and located inside the tank for conveying the food products through the plurality of sections in a direction from the first end of the tank toward the second end of the tank along the length of the tank;
    a temperature controlling system configured to independently control the temperature of the heating liquid in each of the plurality of sections of the tank; and
    a plurality of air supply sources arranged along the length of the tank, the plurality of air supply sources configured to pump air into the heating liquid,
    wherein the temperature controlling system includes a plurality of heat supplying units arranged along the length of the tank, each of the plurality of sections including at least one of the heat supplying units,
    wherein each of the heat supplying units is arranged along a bottom portion of the tank and each of the heat supplying units is configured to upwardly inject a heating agent into the heating liquid toward a surface level of the heating liquid in the tank at an angle generally perpendicular to the surface level of the heating liquid to provide a substantially equally distributed and uniform temperature in the heating liquid along the length of the tank, each of the heat supplying units having an upwardly extending nozzle extending into the tank from a common heat supplying pipe connected to a heat supplying liquid source,
    wherein the temperature of the heating agent injected into the heating liquid is greater than the temperature of the heating liquid,
    wherein the air supply sources are different from the heat supplying units, each of the plurality of sections including at least one of the air supply units, each of the air supply sources having an air supply nozzle extending upwardly into the bottom portion of the tank and oriented to provide an air flow generally perpendicular to and toward the surface level of the heating liquid in the tank,
    wherein pumping air into the heating liquid creates air bubbles in the heating liquid for providing a buoyant force to food products sunken at the bottom of the tank.

2. The apparatus according to claim 1, wherein the multiple heat supplying units are arranged at substantially equal length intervals below the tank.

3. The apparatus according to claim 2, wherein the temperature controlling system further comprises at least one thermometer arranged within at least one of the intervals for measuring the temperature of the heating liquid within the respective interval.

4. The apparatus according to claim 1, wherein the tank defines a lower bottom section and an upper section, the lower bottom section having a semi-circular cross-sectional shape with a diameter substantially the same as a diameter of the spiral-shaped blade such that a distal part of the spiral-shaped blade is located adjacent to the inner lower bottom section of the tank, and wherein two or more of said air supply sources are further distributed across the semi-circular cross-sectional shape of the lower bottom section of the tank.

5. The apparatus according to claim 4, wherein the multiple heat supplying units are arranged across a side of the lower bottom section of the tank where the spiral-shaped blade urges the food products toward the surface level of the heating liquid in the tank.

6. The apparatus according to claim 1, wherein the multiple air supply sources are integrally formed with the multiple nozzles of the heat supplying units.

7. The apparatus according to claim 1, wherein the temperature controlling system further comprises at least one thermometer arranged between the multiple heat supplying units for measuring the temperature of the heating liquid, said measured temperature serving as a control parameter for controlling the injection of the heating agent into the heating liquid.

8. The apparatus according to claim 1, wherein the tank defines a lower bottom section and an upper section, the lower bottom section having a semi-circular cross-sectional shape with a diameter substantially the same as a diameter of the spiral-shaped blade such that a distal part of the spiral-shaped blade is located adjacent to the inner lower bottom section of the tank, and wherein the upper section comprises at least one drain unit for allowing drainage of access liquid from the tank.

9. The apparatus according to claim 8, wherein the at least one drain unit is arranged for allowing the access liquid to be heated up and repeatedly injected into the tank.

10. The apparatus according to claim 9, further comprising a filter positioned between the at least one drain unit and a location where the access liquid is repeatedly injected into the tank.

11. The apparatus according to claim 1, wherein the apparatus further comprises an in-feed unit at the first end of the tank that is configured to feed the frozen food products into the first end of the tank, and
    wherein the apparatus further comprises a rotation motor and control unit configured to drive rotation of the spiral-shaped blade at a speed such that the frozen food products are thawed when they reach the second end of the tank.

12. The apparatus according to claim 1, wherein the apparatus further comprises an in-feed unit configured to feed the frozen food products along into the tank along at a side of the tank at least along a portion of the length of the tank.

13. The apparatus according to claim 1, wherein each of the heat supplying units is located proximate to at least one of the multiple air supply sources such that for each of the heat supplying units, a corresponding one of the air supply units injects air in parallel to the heating agent injected by the corresponding heat supplying unit toward the surface level of the heating liquid in the tank.

14. The apparatus according to claim 1, wherein the tank is divided into two or more sections, and > the multiple heat supplying units arranged along the tank are configured to control a temperature within each of said sections independently.

\* \* \* \* \*